(12) United States Patent
Beall

(10) Patent No.: US 6,290,856 B1
(45) Date of Patent: Sep. 18, 2001

(54) REVERSE OSMOSIS SYSTEM WITH BIOLOGICAL CONTAMINATION PREVENTION

(75) Inventor: Timothy A. Beall, Redondo Beach, CA (US)

(73) Assignee: World Wide Water, Inc., Redondo Beach, CA (US)

( * ) Notice: Subject to any disclaimer, the term of this patent is extended or adjusted under 35 U.S.C. 154(b) by 0 days.

(21) Appl. No.: 09/507,218

(22) Filed: Feb. 18, 2000

Related U.S. Application Data

(60) Provisional application No. 60/120,574, filed on Feb. 18, 1999.

(51) Int. Cl.[7] .................................................. C02F 1/50
(52) U.S. Cl. .................... 210/753; 210/754; 210/759; 210/764; 210/198.1; 210/205; 210/321.69
(58) Field of Search ................................. 210/753, 754, 210/759, 764, 198.1, 205, 321.69

(56) References Cited

U.S. PATENT DOCUMENTS

| | | |
|---|---|---|
| 3,912,624 | * 10/1975 | Jennings . |
| 3,992,301 | 11/1976 | Shippey et al. . |
| 4,278,548 | 7/1981 | Bettinger et al. . |
| 4,517,081 | 5/1985 | Amiot et al. . |
| 4,650,586 | 3/1987 | Ellis, III . |
| 4,865,752 | * 9/1989 | Jacobs . |
| 4,988,444 | 1/1991 | Applegate et al. . |
| 5,403,479 | 4/1995 | Smith et al. . |
| 5,895,578 | 4/1999 | Simard et al. . |

* cited by examiner

Primary Examiner—David A. Simmons
Assistant Examiner—Betsey Morrison Hoey
(74) Attorney, Agent, or Firm—Blakely, Sokoloff, Taylor & Zafman LLP

(57) ABSTRACT

An apparatus for providing a predetermined volume of biocidally treated water to a feed water side of a reverse osmosis device when it is shut down. A biocide dispenser treats a predetermined volume of water from a source with a biocidal agent. A valve, coupled to the source of the predetermined volume of water, transfers the predetermined volume of water to the feed water side of the reverse osmosis device. A controller, coupled to the valve, causes the transfer of the predetermined volume of water after a source of feed water connected to the feed water side of the reverse osmosis device is shut off, and then causes the predetermined volume of water to remain in the feed water side of the reverse osmosis device while the reverse osmosis device is shut down.

21 Claims, 3 Drawing Sheets

REVERSE OSMOSIS SYSTEM WITH BIOLOGICAL CONTAMINATION PREVENTION

CROSS-REFERENCES TO RELATED APPLICATIONS

This application claims the benefit of U.S. Provisional Application No. 60/120,574, filed Feb. 18, 1999, which is incorporated herein by reference.

BACKGROUND OF THE INVENTION

1. Field of the Invention

This invention relates to a system and method for preventing biological contamination of a semi-permeable membrane in a reverse osmosis system.

2. Background Information

Reverse osmosis systems are used to purify water by supplying a pressurized feed water stream to one side of a semi-permeable membrane in a reverse osmosis device. The pressure is maintained at a level sufficient to force the water through the membrane while retaining dissolved impurities on the feed water side. One important application is the purification of water used for human consumption. Purification removes impurities which make the water unsafe or unpotable, or which impart an undesirable taste or appearance to the water.

The treatment of water that contains microorganisms can limit the useful life of the semi-permeable membrane. The microorganisms tend to become imbedded and multiply in the membranes, causing clogging and fouling of the reverse osmosis unit. Further, the multiplying presence of the microorganisms increases the adverse consequences of their presence in the feed water. Treatment of water to combat microorganisms reduces the presence and effect of the microorganisms in proportion to the number of organisms present. Therefore, the multiplying of microorganisms on the semi-permeable membrane reduces the purity of product water from the reverse osmosis device and requires more aggressive measures to kill the microorganisms in the product water.

Large municipal and industrial reverse osmosis systems utilize out of system scrubbing of the semi-permeable membranes, careful chemical treatment of the feed water, and/or special chemical flushing cycles to control the buildup of microorganisms and other impurities on the semi-permeable membrane. However, such techniques are impractical for small point of use systems, such as under-sink home units, which must be small, simple, and reliable. These systems should require infrequent servicing and preferably be operable without electric power. Typically these systems will operate to purify water during and following the dispensing of water from the system and then shut down for period of hours or even days. During the shut down period the feed water is stagnant against the semi-permeable membrane, providing conditions that are conducive to multiplication of microorganisms present in the feed water.

Accordingly, there is a need for a simple and reliable device to prevent biological contamination of the semi-permeable membrane in a reverse osmosis device.

SUMMARY OF THE INVENTION

An apparatus for providing a predetermined volume of biocidally treated water to a feed water side of a reverse osmosis device when it is shut down. A biocide dispenser treats a predetermined volume of water from a source with a biocidal agent. A valve, coupled to the source of the predetermined volume of water, transfers the predetermined volume of water to the feed water side of the reverse osmosis device. A controller, coupled to the valve, causes the transfer of the predetermined volume of water after a source of feed water connected to the feed water side of the reverse osmosis device is shut off, and then causes the predetermined volume of water to remain in the feed water side of the reverse osmosis device while the reverse osmosis device is shut down.

DETAILED DESCRIPTION OF THE INVENTION

Figure 1:
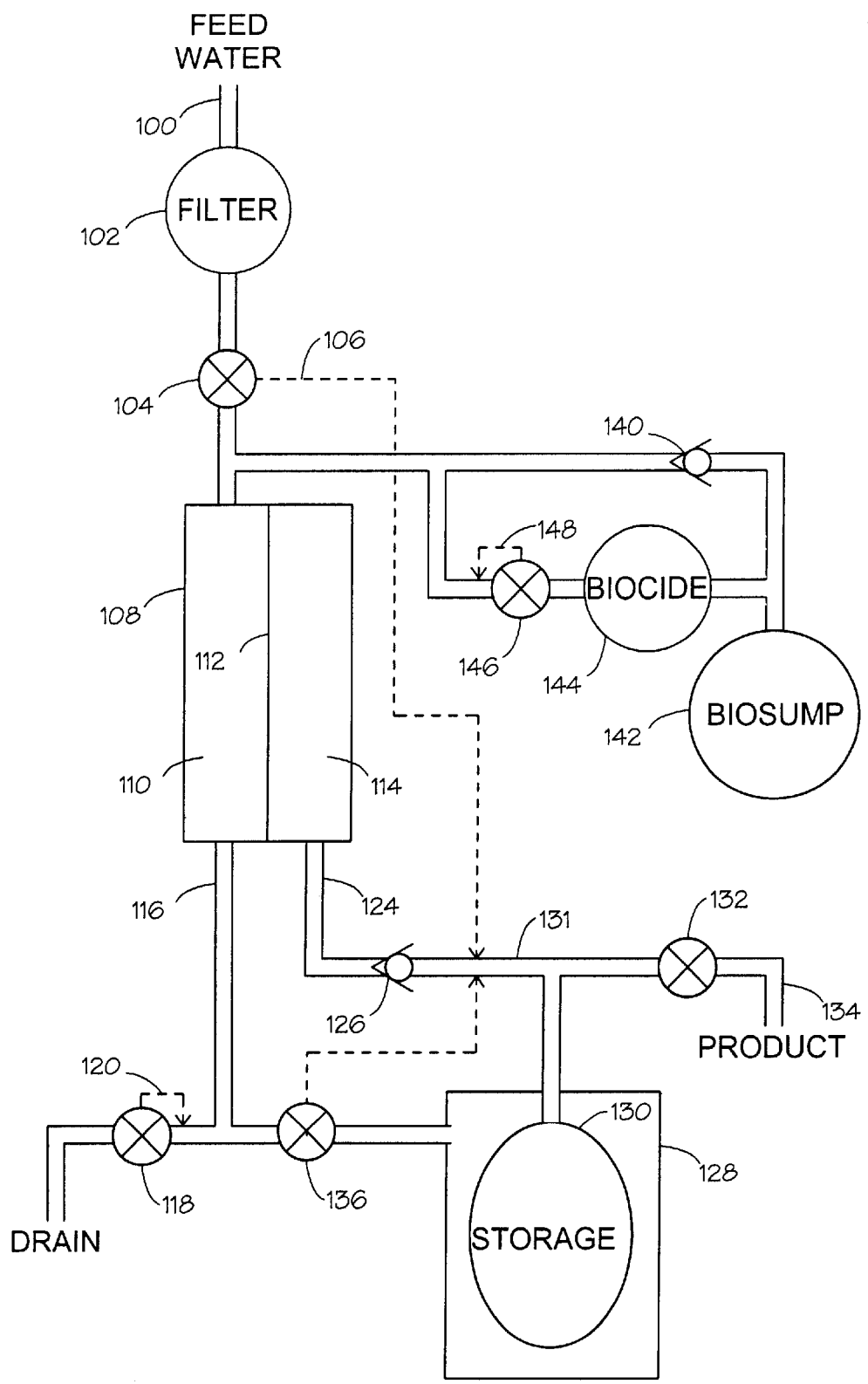
FIG. 1 is a schematic diagram of a reverse osmosis system with an embodiment of the invention.

FIG. 1 is a schematic drawing illustrating one type of reverse osmosis system that includes an embodiment of the present invention. Feed water 100 is supplied to the system and passed through a filter 102 to remove sediment and other particles. An on-off valve 104 controls the admission of feed water to the system. The on-off valve is controlled by sensing the pressure 106 in a supply line 131 which supplies purified product water. When the pressure in the supply line drops, indicating that product water is being drawn from the system, the on-off valve 104 opens to begin a purification cycle that replenishes the water being dispensed.

The feed water enters a reverse osmosis device 108. The reverse osmosis device has a feed water side 110 and a product water side 114 separated by a semi-permeable membrane 112. The pressure of the feed water on the feed water side of the membrane forces water to pass through the membrane to the product water side. The semi-permeable membrane holds back impurities in the water so that the product water is highly purified while the feed water becomes more concentrated with regard to the impurities present.

Concentrated feed water is discharged through a discharge line 116. Reverse osmosis devices generally discharge a greater amount of the water than product water. It is necessary to maintain a flow rate on the feed water side of the membrane to prevent a buildup of impurities on the membrane. A back pressure controller 118 senses the pressure 120 in the discharge line. The back pressure controller maintains a sufficient pressure to drive the reverse osmosis process and prevent the pressure from rising to the point where the membrane would be damaged.

Purified product water collects on the product water side 114 of the reverse osmosis device 108. The product water is discharged through a product water line 124 through a one-way valve 126. Product water is accumulated in a storage device 128 because product water is produced relatively slowly, generally at a much lower rate than would necessary to produce product water on demand. The storage device illustrated is a squeeze water type accumulator. The product water is collected in a storage bladder 130 that expands as it is filled within the outer housing of the storage device. When product water is dispensed by opening dispensing valve 132 allowing product water to flow from the dispensing spigot 134, the pressure in the supply line 131 drops. The pressure drop turns on the on-off valve 104 and a squeeze water valve 136 which causes concentrated feed water to be supplied to the outside of the storage bladder 130 thereby pressurizing the product water in the bladder and forcing it into the supply line 131, through the dispensing valve 132, and out the dispensing spigot 134. The reverse osmosis device 108 operates in a purifying cycle that begins when product water is dispensed causing the on-off valve 104 to open and ends when the storage device 128 is full causing the on-off valve 104 to close. When the purification cycle is complete, the reverse osmosis device is shut down, a condition that may continue for a number of hours or even days.

When the reverse osmosis device 108 is shut down and the on-off valve 104 is closed to shut off the supply of feed water 100, a control valve 146 is opened causing a flow of water through a biocide dispenser 144 to supply a predetermined quantity of water to the feed water side 110 of the reverse osmosis device. The control valve is opened for a period time required to transfer the desired quantity of water. The length of time the control valve is open can be controlled by various means such as hydraulic or electrical timing. The predetermined quantity of water contains a biocidal agent added by the biocide dispenser. This treated predetermined quantity of water fills the feed water side 110 of the reverse osmosis device and remains there during the period when the reverse osmosis device is shut down.

The biocide dispenser 144 may dispense biocidal agents such as iodine, chlorine, or hydrogen peroxide. The biocide should be chosen with consideration for the types of biological contaminants present in the feed water and for the type of membrane 112 used in the reverse osmosis device. Some biocides are deleterious to some types of semipermeable membranes. One form of biocide is an iodinator in the form of an iodinated resin which releases iodine as the feed water flows through the resin bed. Water containing 0.5 to 15 ppm of iodine has been found to be an effective biocidal solution. Ideally, little to none of the biocide will pass through the semi-permeable membrane to appear in the product water. The small volume of biocidal solution used and the use only when the reverse osmosis system is shut down, reduces the opportunity for biocide to find its way into product water. Nonetheless, it may be desirable to provide treatment of the product water to remove any traces of the biocide and/or make provisions for purging the product water side of the reverse osmosis device before collecting product water following a shut down of the system.

Figure 2:
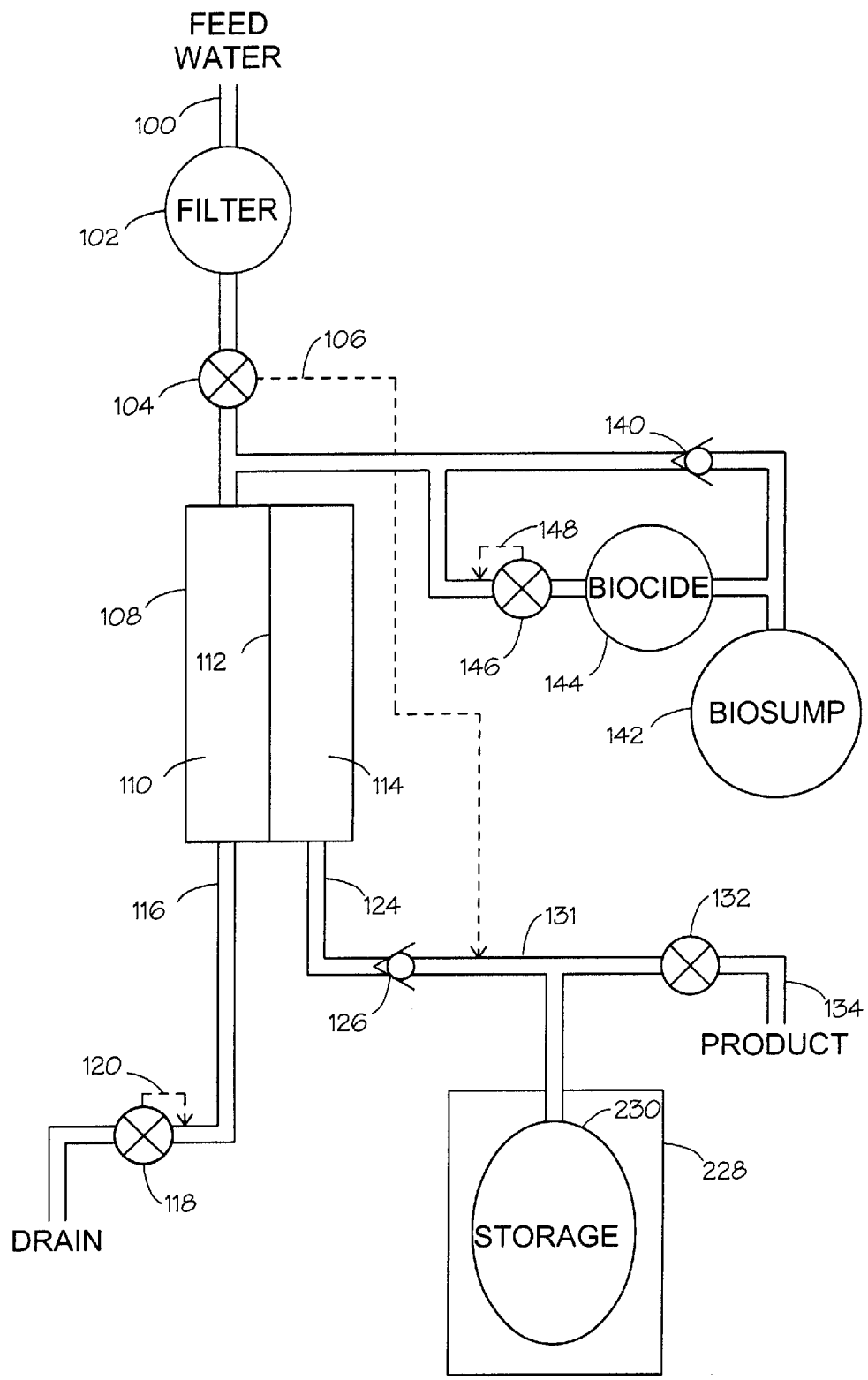
FIG. 2 is a schematic diagram of another reverse osmosis system with another embodiment of the invention.

FIG. 2 shows another type of reverse osmosis system with another embodiment of the present invention. In this system, the product water storage device 228 is a gas pressurized accumulator. During a purification cycle, the product water flows into the storage bladder 230 of the accumulator which expands against a gas, such as air, inside the sealed housing of the accumulator. This form of accumulator stores the product water under pressure and does not require the squeeze water supply to pressurize the product water for dispensing. It will be appreciated that the configuration of the present invention is unaffected by the type of storage used in the reverse osmosis system.

In the embodiment of the invention illustrated in FIG. 2, a biosump 142 is provided to accumulate a predetermined quantity of feed water through a one-way valve 140 when feed water is being supplied to the system through the on-off valve 104. The biosump includes a gas pressure type fluid accumulator that accumulates feed water until a pressure equilibrium is established. When the purification cycle ends, the on-off valve 104 will close and the pressure on the feed water side 110 of the reverse osmosis device 108 will begin to fall. The feed water accumulated in the biosump will flow through the biocide dispenser 144 and through the control valve 146 which is controlled 148 by the pressure of the inlet line to the reverse osmosis device. This causes a predetermined quantity of biocidally treated water to fill the feed water side 110 of the reverse osmosis device, the accumulator of the biosump being a metering device for the water transferred to the reverse osmosis device after shut down. As a result, the feed water side of the reverse osmosis membrane 112 is bathed in a biocidal solution during the periods when the reverse osmosis system is shut down.

The term "predetermined quantity" is used to mean a quantity of water established by the operating conditions of the reverse osmosis system. For example, in the embodiment shown in FIG. 1 the predetermined quantity of water transferred to the feed water side 110 of the reverse osmosis device will be determined by the length of time the control valve 146 is open and the rate of flow through the valve. In the embodiments shown in FIGS. 2 and 3, the predetermined quantity of water held in the biosump is determined by the dimensions and operating pressure of the gas pressure accumulator used for the biosump and by the pressure at which the water is supplied to the gas pressure accumulator. It will be appreciated that the predetermined quantity is increased if the water is supplied at a higher pressure. Ideally the predetermined volume transferred from the biosump to the feed water side of the reverse osmosis device is substantially the same or only slightly greater than the volume of the feed water side so that the biocidal agent is conserved and the need to replenish the biocidal agent is reduced.

Figure 3:
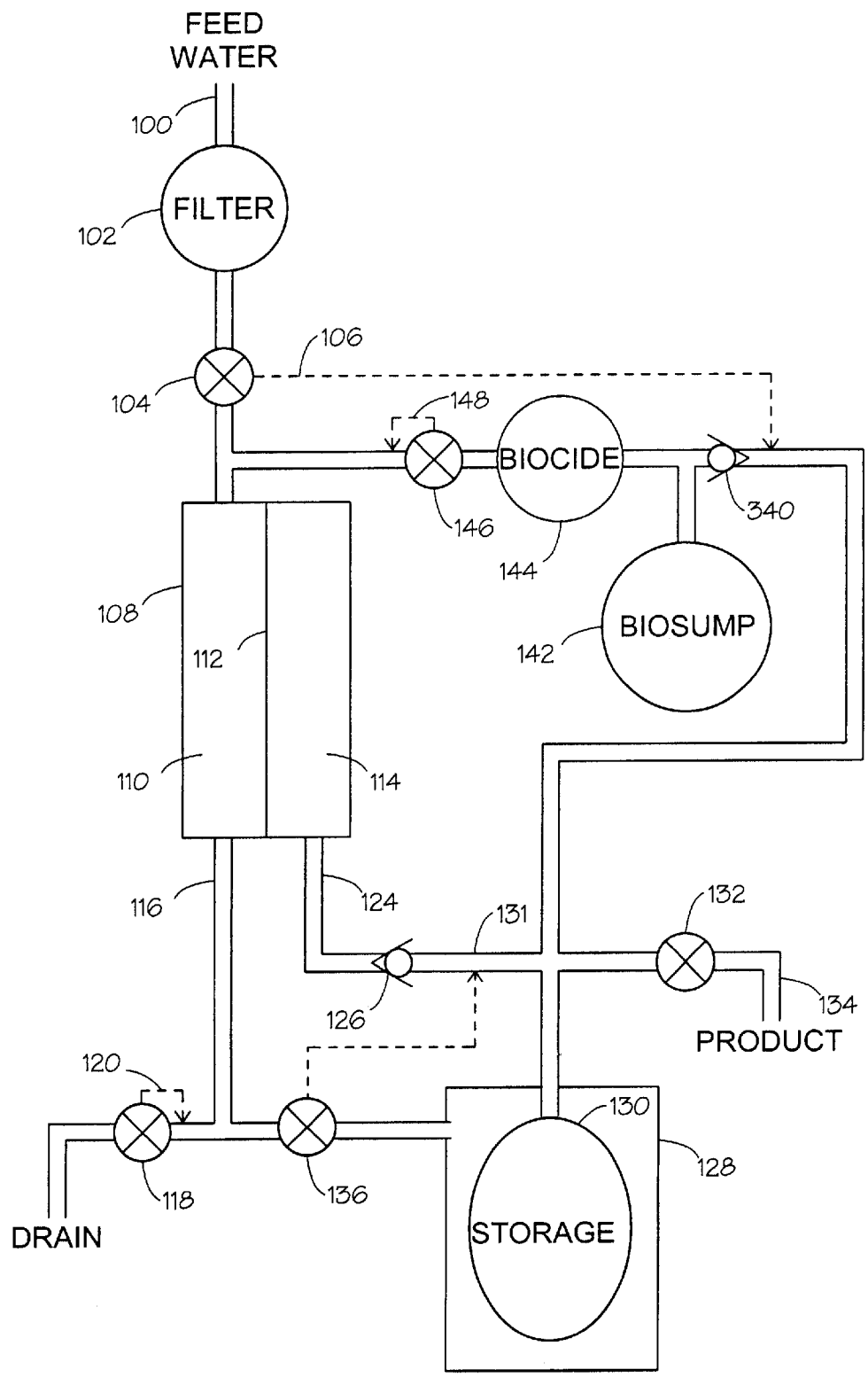
FIG. 3 is a schematic diagram of a reverse osmosis system with another embodiment of the invention.

FIG. 3 shows a reverse osmosis system with another embodiment of the present invention. In this embodiment, the biosump 142 is filled with a predetermined quantity of product water through a one-way valve 340. As in the previous embodiment, the drop in pressure on the feed water side 110 of the reverse osmosis device 108 causes a predetermined quantity of water to flow from the biosump through a biocide dispenser 144 when the control valve 146 opens in response to the drop in pressure 148 on the feed water side 110 of the reverse osmosis device. The use of product water rather than feed water in the biosump may be advantageous when the quality of the feed water is such that it would foul the biocide dispenser.

While the biosump has been described with embodiments that use an air pressure type accumulator, it will be appreciated that other embodiments of the invention could use a squeeze water type accumulator for the biosump. It will also be appreciated that additional embodiments of the invention could combine the biosump with the product water accumulator and use a single accumulator to provide the function of both the biosump and the product water accumulator.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
   a source of a predetermined volume of water;
   a biocide dispenser that treats the predetermined volume of water with a biocidal agent;
   a valve, coupled to the source of the predetermined volume of water, to transfer the predetermined volume of water to a feed water side of a reverse osmosis device; and a controller, coupled to the valve, to cause the transfer of the predetermined volume of water after a source of feed water connected to the feed water side of the reverse osmosis device is shut off, and then causes the predetermined volume of water to remain in the feed water side of the reverse osmosis device while the reverse osmosis device is shut down.

2. The apparatus of claim 1 wherein the source of the predetermined volume of water is product water produced by the reverse osmosis device, the apparatus further comprising a biosump that accumulates the product water for the predetermined volume of water.

3. The apparatus of claim 1 wherein the source of the predetermined volume of water is feed water.

4. The apparatus of claim 1 wherein the predetermined volume of water is substantially equal to a volume of the feed water side of the reverse osmosis device.

5. The apparatus of claim 1 wherein the biocide dispenser further comprises an iodinated resin.

6. The apparatus of claim 1 wherein the biocidal agent is contained in a resin bed.

7. The apparatus of claim 1 wherein the biocide dispenser treats the predetermined volume of water with the biocidal agent as it is transferred to the feed water side of the reverse osmosis device.

8. A method of preventing biological contamination of a reverse osmosis system comprising:

treating a predetermined volume of water with a biocidal agent; and transferring the treated predetermined volume of water to a feed water side of the reverse osmosis system when the system ends a purification cycle and is shut down, thereby leaving the feed water side of the reverse osmosis system filled with the treated predetermined volume of water.

9. The method of claim 8 further comprising accumulating product water produced by the reverse osmosis system as the predetermined volume of water.

10. The method of claim 8 further comprising accumulating feed water as the predetermined volume of water.

11. The method of claim 8 wherein the predetermined volume of water is substantially equal to a volume of the feed water side of the reverse osmosis device.

12. The method of claim 8 wherein the biocidal agent is at least one of iodine, chlorine, and hydrogen peroxide.

13. The method of claim 8 wherein treating the predetermined volume of water further comprises passing the predetermined volume of water through a resin bed that releases the biocidal agent.

14. The method of claim 8 wherein treating the predetermined volume of water is accomplished concurrently with transferring the predetermined volume of water.

15. An reverse osmosis system comprising:

a reverse osmosis device having a feed water side and a product side separated by a semi-permeable membrane;

a source of a predetermined volume of water;

a biocide dispenser that treats the predetermined volume of water with a biocidal agent;

a valve, coupled to the source of the predetermined volume of water and the feed water side of the reverse osmosis device, to transfer the predetermined volume of water to the feed water side of the reverse osmosis device; and a controller, coupled to the valve, to cause the transfer of the predetermined volume of water after a source of feed water connected to the feed water side of the reverse osmosis device is shut off, and then causes the predetermined volume of water to remain in the feed water side of the reverse osmosis device while the reverse osmosis device is shut down.

16. The reverse osmosis system of claim 15 wherein the source of the predetermined volume of water is product water produced by the reverse osmosis device, the apparatus further comprising a biosump that accumulates the product water for the predetermined volume of water.

17. The reverse osmosis system of claim 15 wherein the source of the predetermined volume of water is feed water.

18. The reverse osmosis system of claim 15 wherein the predetermined volume of water is substantially equal to a volume of the feed water side of the reverse osmosis device.

19. The reverse osmosis system of claim 15 wherein the biocide dispenser further comprises an iodinated resin.

20. The reverse osmosis system of claim 15 wherein the biocidal agent is contained in a resin bed.

21. The reverse osmosis system of claim 15 wherein the biocide dispenser treats the predetermined volume of water with the biocidal agent as it is transferred to the feed water side of the reverse osmosis device.

\* \* \* \* \*